US012726531B2

(12) United States Patent
Zhang et al.

(10) Patent No.: US 12,726,531 B2
(45) Date of Patent: Sep. 1, 2026

(54) PARTICIPANT ORIENTATION STABILIZATION FOR ONLINE MEETINGS

(71) Applicant: Citrix Systems, Inc., Fort Lauderdale, FL (US)

(72) Inventors: Xiao Zhang, Nanjing (CN); Zongpeng Qiao, Nanjing (CN); Jie Zhuang, Nanjing (CN); Bo Chen, Nanjing (CN)

( * ) Notice: Subject to any disclaimer, the term of this patent is extended or adjusted under 35 U.S.C. 154(b) by 449 days.

(21) Appl. No.: 17/804,399

(22) Filed: May 27, 2022

(65) Prior Publication Data

US 2023/0336681 A1 Oct. 19, 2023

Related U.S. Application Data

(63) Continuation of application No. PCT/CN2022/087592, filed on Apr. 19, 2022.

(51) Int. Cl.

| | |
|---|---|
| ***H04L 65/403*** | (2022.01) |
| ***G06T 7/73*** | (2017.01) |
| ***H04N 5/262*** | (2006.01) |
| ***H04N 5/265*** | (2006.01) |
| ***H04N 7/15*** | (2006.01) |

(52) U.S. Cl.

CPC .............. *H04L 65/403* (2013.01); *G06T 7/74* (2017.01); *H04N 5/2628* (2013.01); *H04N 5/265* (2013.01); *H04N 7/15* (2013.01)

(58) Field of Classification Search

None

See application file for complete search history.

(56) References Cited

U.S. PATENT DOCUMENTS

| | | | | |
|---|---|---|---|---|
| 2009/0219387 A1 | | 9/2009 | Marman | |
| 2013/0083153 A1* | | 4/2013 | Lindbergh | H04N 7/15 348/E7.083 |
| 2018/0063482 A1* | | 3/2018 | Goesnar | H04N 23/58 |
| 2019/0065895 A1* | | 2/2019 | Wang | G06V 40/172 |
| 2019/0215464 A1* | | 7/2019 | Kumar | H04N 7/08 |
| 2020/0099889 A1* | | 3/2020 | Sugihara | H04N 7/147 |
| 2020/0099890 A1* | | 3/2020 | Tanaka | H04N 7/147 |
| 2022/0329727 A1* | | 10/2022 | Bryan | H04N 23/64 |
| 2023/0121654 A1* | | 4/2023 | Tangeland | H04L 65/764 348/14.07 |

(Continued)

FOREIGN PATENT DOCUMENTS

| | | |
|---|---|---|
| CN | 107077598 A | 8/2017 |
| CN | 107423409 A | 12/2017 |

(Continued)

OTHER PUBLICATIONS

International Search Report and Written Opinion issued in App. No. PCT/CN2021/131493, mailing date May 25, 2022, 10 pages.

*Primary Examiner* — Quoc D Tran

(57) ABSTRACT

In one aspect, an example methodology implementing the disclosed techniques can include, by a first computing device, determining a reference image showing (e.g., encoding) an orientation of a user participating in an online meeting and receiving a video stream captured by a camera, the video stream associated with the online meeting. The method can also include, by the computing device, responsive to a determination of a change in the orientation of the user appearing within the video stream, providing modified video stream in which the orientation of the user is adjusted based on the reference image.

20 Claims, 8 Drawing Sheets

(56) References Cited

U.S. PATENT DOCUMENTS

| | | | | |
|---|---|---|---|---|
| 2023/0237837 | A1* | 7/2023 | Shepherd | G06V 40/166 382/104 |
| 2024/0054786 | A1* | 2/2024 | Andresen | H04N 5/2628 |

FOREIGN PATENT DOCUMENTS

| | | | |
|---|---|---|---|
| CN | 110766645 | A | 2/2020 |
| CN | 111316656 | A | 6/2020 |
| CN | 112884796 | A | 6/2021 |
| WO | 2020141745 | A1 | 7/2020 |

* cited by examiner

PARTICIPANT ORIENTATION STABILIZATION FOR ONLINE MEETINGS

CROSS REFERENCE TO RELATED APPLICATIONS

This application is a continuation of and claims the benefit of PCT Patent Application No. PCT/CN2022/087592 filed on Apr. 19, 2022 in the English language in the State Intellectual Property Office and designating the United States, the contents of which are hereby incorporated herein by reference in its entirety.

BACKGROUND

Use of video conferencing is becoming prevalent. Video conferencing is an on-line technology that enables users in different locations to engage in a live audio-visual call that simulates a face-to-face meeting. Various online meeting and conferencing services, such as TEAMS, SKYPE, ZOOM, GOTOMEETING, and WEBEX, may provide video conferencing among other features. To attend a video conference, a user may permit an online meeting application installed on their client device to access a video camera connected to, or otherwise associated with, the client device. Using the video camera, the online meeting application may capture and share a video stream that includes images of the user's appearing within the camera's field of view.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

Participants may tend to move about during an online meeting with video conferencing enabled. For example, a participant may tend to rock back-and-forth or side-to-side in their chair. As another example, a participant may inadvertently move in and out of the field of view of their video camera. As a result of such movements, a participant's orientation within a video stream may change during an online meeting and, in some cases, may result in the participant's appearance being partially or entirely excluded from the video stream. For example, a participant's face may temporarily be excluded from the video stream due to movement. This can result in diminished user experience for the other meeting participants. Embodiments of the present disclosure can enhance, among other aspects, the quality of the shared video stream by automatically stabilizing the orientation of participants appearing within a shared video stream.

In accordance with one example embodiment provided to illustrate the broader concepts, systems, and techniques described herein, a method includes, by a first computing device, determining a reference image showing an orientation of a user participating in an online meeting and receiving a video stream captured by a camera, the video stream associated with the online meeting. The method also includes, by the computing device, responsive to a determination of a change in the orientation of the user appearing within the video stream, providing modified video stream in which the orientation of the user is adjusted based on the reference image.

In some embodiments, providing the modified video stream includes enlarging a size of a face of the user in the video stream. In some embodiments, providing the modified video stream includes reducing a size of a face of the user in the video stream. In some embodiments, providing the modified video stream includes repositioning a face of the user in the video stream.

In some embodiments, determining the reference image comprises receiving the reference image from another computing device. In some embodiments, the determination of the change in the orientation of the user is based on a comparison of an image of the video stream to the reference image.

In some embodiments, the video stream is received from a first client device, and the method further includes, by the computing device, transmitting the modified video stream to the first client device.

In some embodiments, the video stream is received from a first client device, and the method further includes, by the computing device, transmitting the modified video stream to a second client device.

In some embodiments, the modified video stream is included in another video stream of the online meeting.

According to another illustrative embodiment provided to illustrate the broader concepts described herein, a system includes a processor and a non-volatile memory storing computer program code that when executed on the processor, causes the processor to execute a process corresponding to the aforementioned method or any described embodiment thereof.

According to another illustrative embodiment provided to illustrate the broader concepts described herein, a non-transitory machine-readable medium encodes instructions that when executed by one or more processors cause a process to be carried out, the process corresponding to the aforementioned method or any described embodiment thereof.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Figure 1:
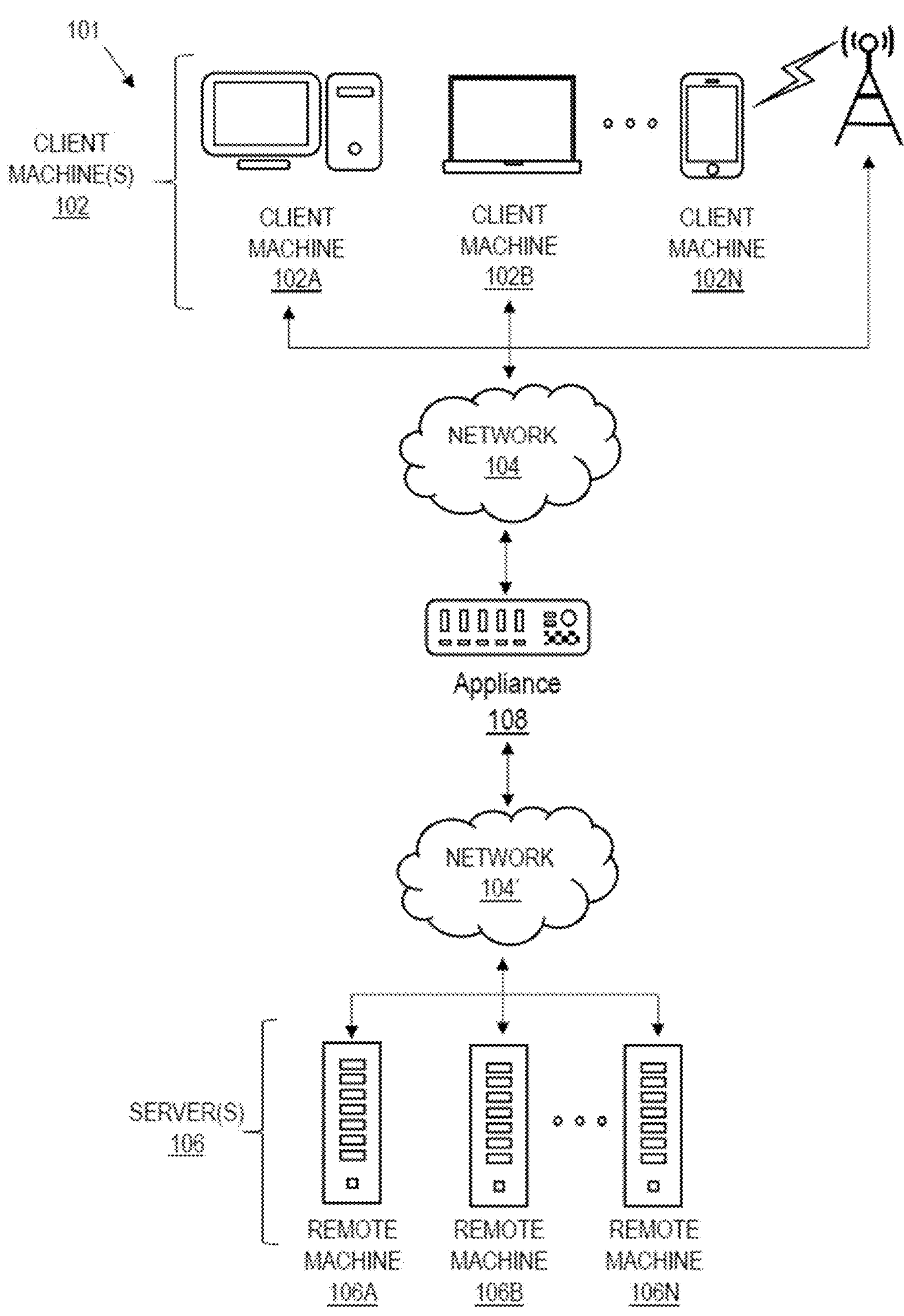
FIG. 1 is a diagram of an illustrative network computing environment in which embodiments of the present disclosure may be implemented.

Referring now to FIG. 1, shown is an illustrative network environment 101 of computing devices in which various aspects of the disclosure may be implemented, in accordance with an embodiment of the present disclosure. As shown, environment 101 includes one or more client machines 102A-102N, one or more remote machines 106A-106N, one or more networks 104, 104', and one or more appliances 108 installed within environment 101. Client machines 102A-102N communicate with remote machines 106A-106N via networks 104, 104'.

In some embodiments, client machines 102A-102N communicate with remote machines 106A-106N via an intermediary appliance 108. The illustrated appliance 108 is positioned between networks 104, 104' and may also be referred to as a network interface or gateway. In some embodiments, appliance 108 may operate as an application delivery controller (ADC) to provide clients with access to business applications and other data deployed in a datacenter, a cloud computing environment, or delivered as Software as a Service (SaaS) across a range of client devices, and/or provide other functionality such as load balancing, etc. In some embodiments, multiple appliances 108 may be used, and appliance(s) 108 may be deployed as part of network 104 and/or 104'.

Client machines 102A-102N may be generally referred to as client machines 102, local machines 102, clients 102, client nodes 102, client computers 102, client devices 102, computing devices 102, endpoints 102, or endpoint nodes 102. Remote machines 106A-106N may be generally referred to as servers 106 or a server farm 106. In some embodiments, a client device 102 may have the capacity to function as both a client node seeking access to resources provided by server 106 and as a server 106 providing access to hosted resources for other client devices 102A-102N. Networks 104, 104' may be generally referred to as a network 104. Networks 104 may be configured in any combination of wired and wireless networks.

Server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

Server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, server 106 may execute a remote presentation services program or other program that uses a thin-client or a remote-display protocol to capture display output generated by an application executing on server 106 and transmit the application display output to client device 102.

In yet other embodiments, server 106 may execute a virtual machine providing, to a user of client device 102, access to a computing environment. Client device 102 may be a virtual machine. The virtual machine may be managed by, for example, a hypervisor, a virtual machine manager (VMM), or any other hardware virtualization technique within server 106.

In some embodiments, network 104 may be: a local-area network (LAN); a metropolitan area network (MAN); a wide area network (WAN); a primary public network; and a primary private network. Additional embodiments may include a network 104 of mobile telephone networks that use various protocols to communicate among mobile devices. For short range communications within a wireless local-area network (WLAN), the protocols may include 802.11, Bluetooth, and Near Field Communication (NFC).

Figure 2:
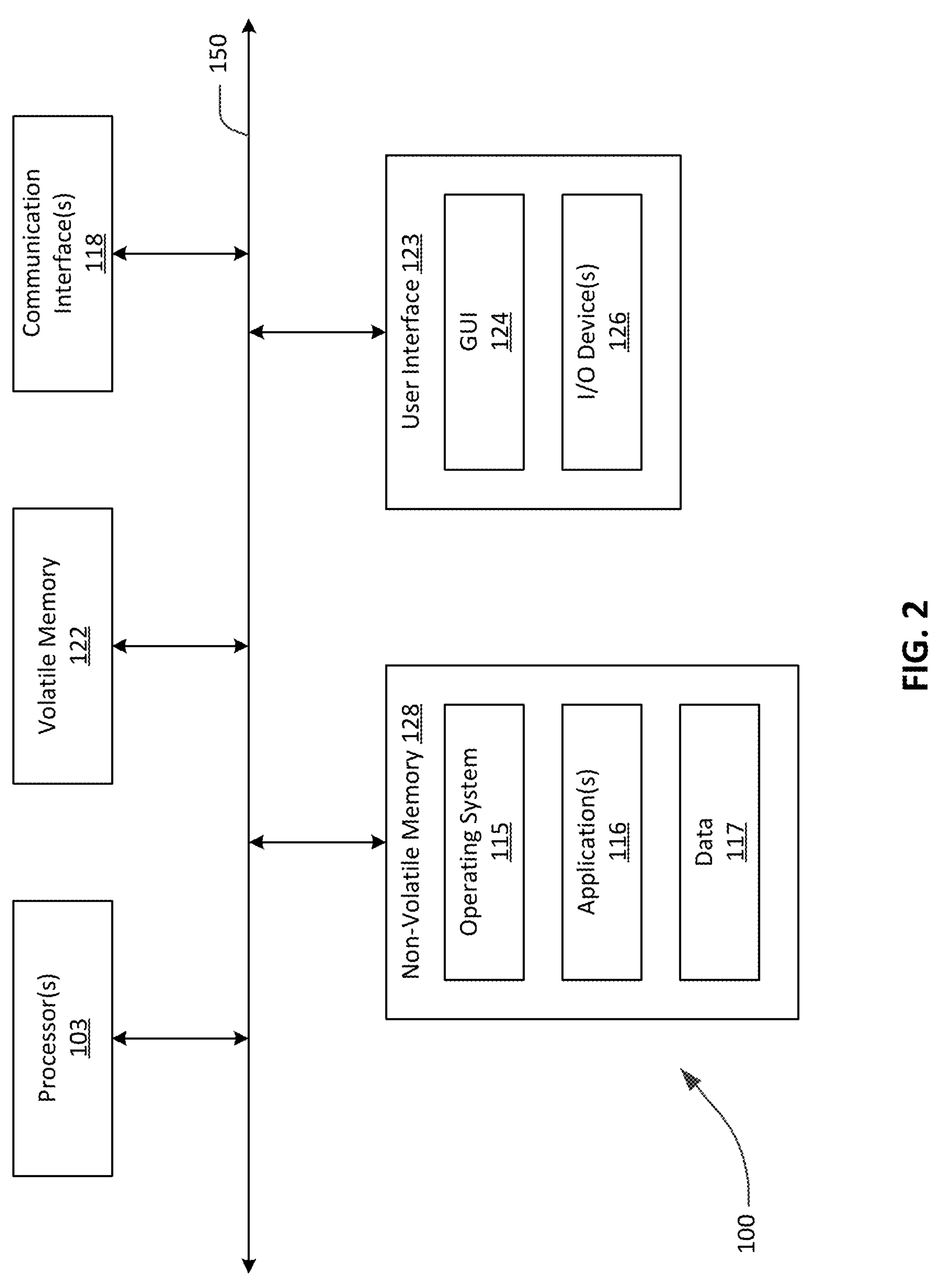
FIG. 2 is a block diagram illustrating selective components of an example computing device in which various aspects of the disclosure may be implemented, in accordance with an embodiment of the present disclosure.

FIG. 2 is a block diagram illustrating selective components of an illustrative computing device 100 in which various aspects of the disclosure may be implemented, in accordance with an embodiment of the present disclosure. For instance, client devices 102, appliances 108, and/or servers 106 of FIG. 1 can be substantially similar to computing device 100. As shown, computing device 100 includes one or more processors 103, a volatile memory 122 (e.g., random access memory (RAM)), a non-volatile memory 128, a user interface (UI) 123, one or more communications interfaces 118, and a communications bus 150.

Non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

Non-volatile memory 128 stores an operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computing device 100 may communicate via communications bus 150.

The illustrated computing device 100 is shown merely as an illustrative client device or server and may be implemented by any computing or processing environment with any type of machine or set of machines that may have suitable hardware and/or software capable of operating as described herein.

Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 103 may be analog, digital or mixed signal. In some embodiments, processor 103 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 118 may include one or more interfaces to enable computing device 100 to access a computer network such as a Local Area Network (LAN), a Wide Area Network (WAN), a Personal Area Network (PAN), or the Internet through a variety of wired and/or wireless connections, including cellular connections.

In described embodiments, computing device 100 may execute an application on behalf of a user of a client device. For example, computing device 100 may execute one or more virtual machines managed by a hypervisor. Each virtual machine may provide an execution session within which applications execute on behalf of a user or a client device, such as a hosted desktop session. Computing device 100 may also execute a terminal services session to provide a hosted desktop environment. Computing device 100 may provide access to a remote computing environment including one or more applications, one or more desktop applications, and one or more desktop sessions in which one or more applications may execute.

Figure 3:
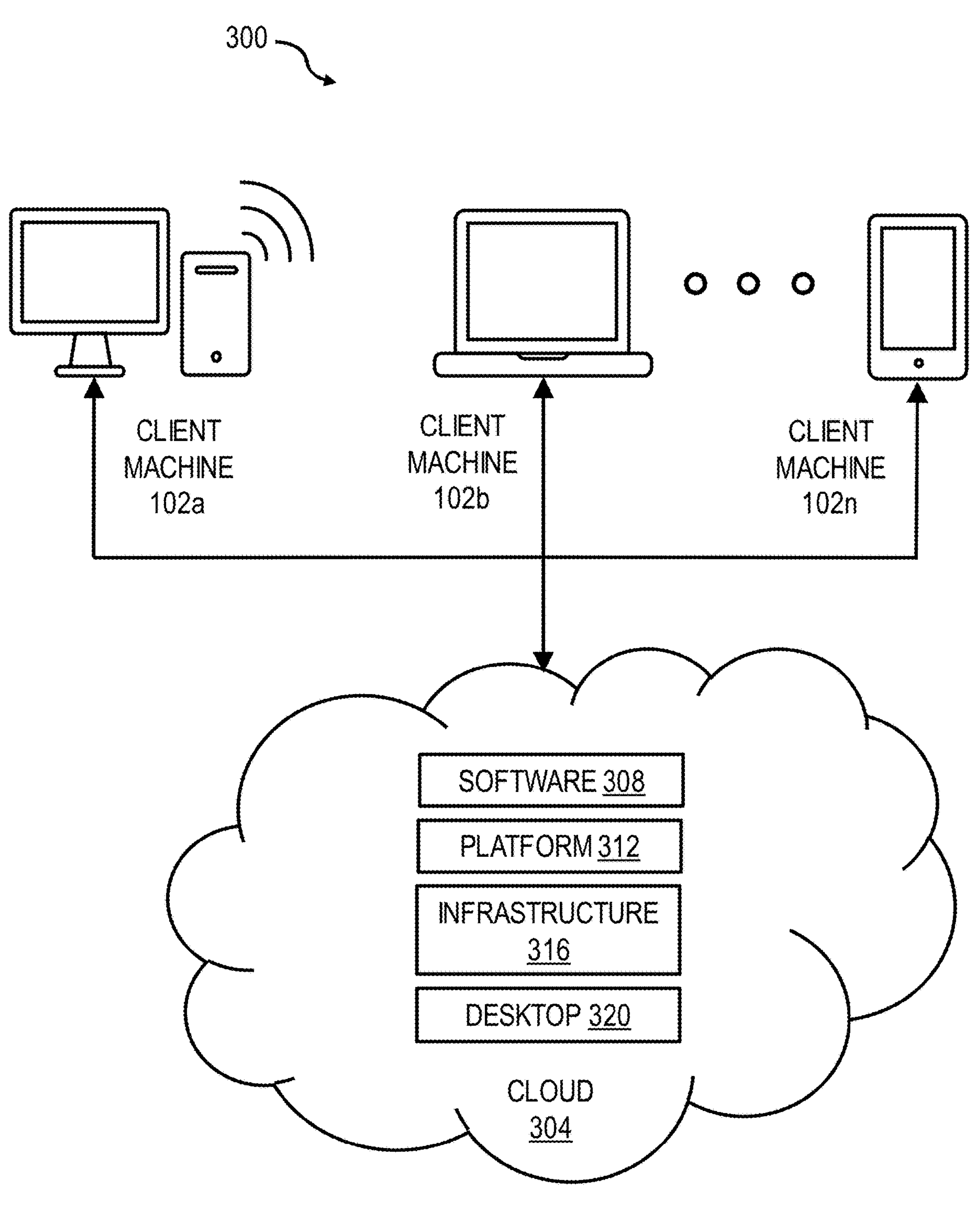
FIG. 3 is a schematic block diagram of a cloud computing environment in which various aspects of the disclosure may be implemented.

Referring to FIG. 3, a cloud computing environment 300 is depicted, which may also be referred to as a cloud environment, cloud computing or cloud network. Cloud computing environment 300 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In cloud computing environment 300, one or more clients **102*a*-102*n* (such as those described above) are in communication with a cloud network 304. Cloud network 304 may include back-end platforms, e.g., servers, storage, server farms or data centers. The users or clients 102*a*-102*n* can correspond to a single organization/tenant or multiple organizations/tenants. More particularly, in one illustrative implementation, cloud computing environment 300 may provide a private cloud serving a single organization (e.g., enterprise cloud). In another example, cloud computing environment 300** may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, cloud computing environment 300 may provide a hybrid cloud that is a combination of a public cloud and a private cloud. Public clouds may include public servers that are maintained by third parties to clients **102*a*-102*n*** or the enterprise/tenant. The servers may be located off-site in remote geographical locations or otherwise.

Cloud computing environment 300 can provide resource pooling to serve multiple users via clients **102*a*-102*n* through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, cloud computing environment 300 can provide on-demand self-service to unilaterally provision computing capabilities (e.g., server time, network storage) across a network for multiple clients 102*a*-102*n*. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. Cloud computing environment 300 can provide an elasticity to dynamically scale out or scale in response to different demands from one or more clients 102. In some embodiments, cloud computing environment 300** can include or provide monitoring services to monitor, control and/or generate reports corresponding to the provided shared services and resources.

In some embodiments, cloud computing environment 300 may provide cloud-based delivery of different types of cloud computing services, such as Software as a service (SaaS) 308, Platform as a Service (PaaS) 312, Infrastructure as a Service (IaaS) 316, and Desktop as a Service (DaaS) 320, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g., Citrix ShareFile from Citrix Systems, DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Washington (herein "Azure"), or AMAZON WEB SERVICES provided by Amazon.com, Inc., of Seattle, Washington (herein "AWS"), for example. In the case of Citrix Cloud, Citrix Workspace app may be used as a single-entry point for bringing apps, files and desktops together (whether on-premises or in the cloud) to deliver a unified experience.

Figure 4A:
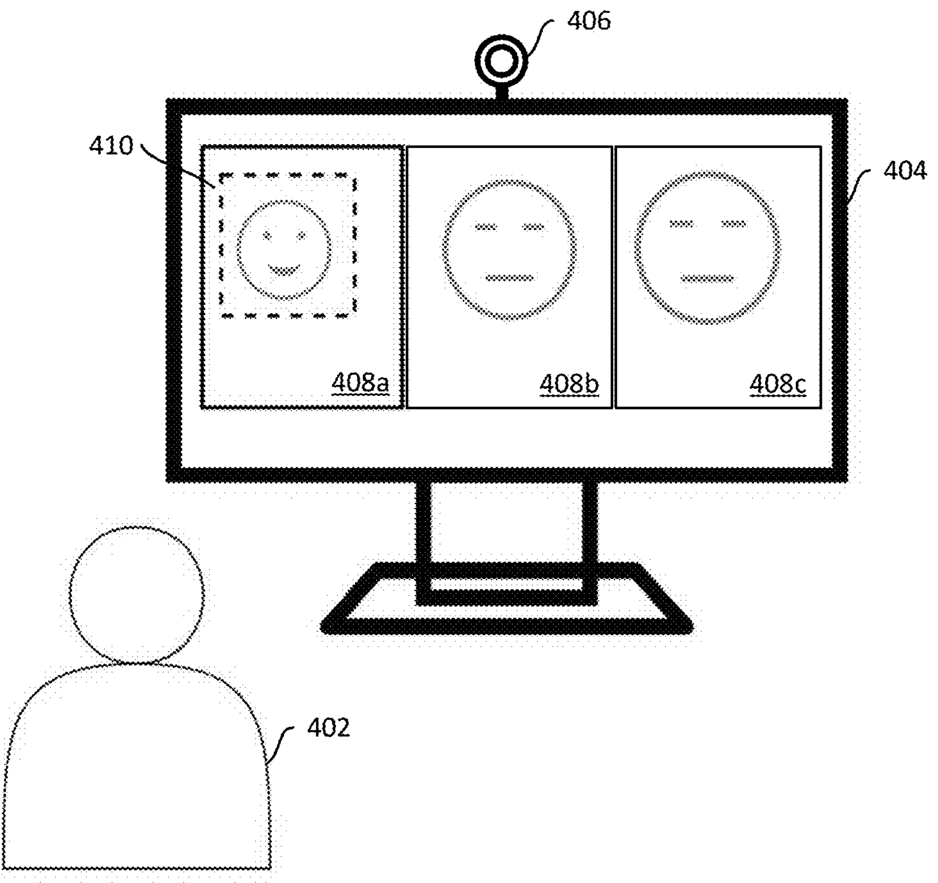
FIGS. 4A and 4B illustrate stabilization of a participant's orientation during an online meeting, in accordance with an embodiment of the present disclosure.
Figure 4B:
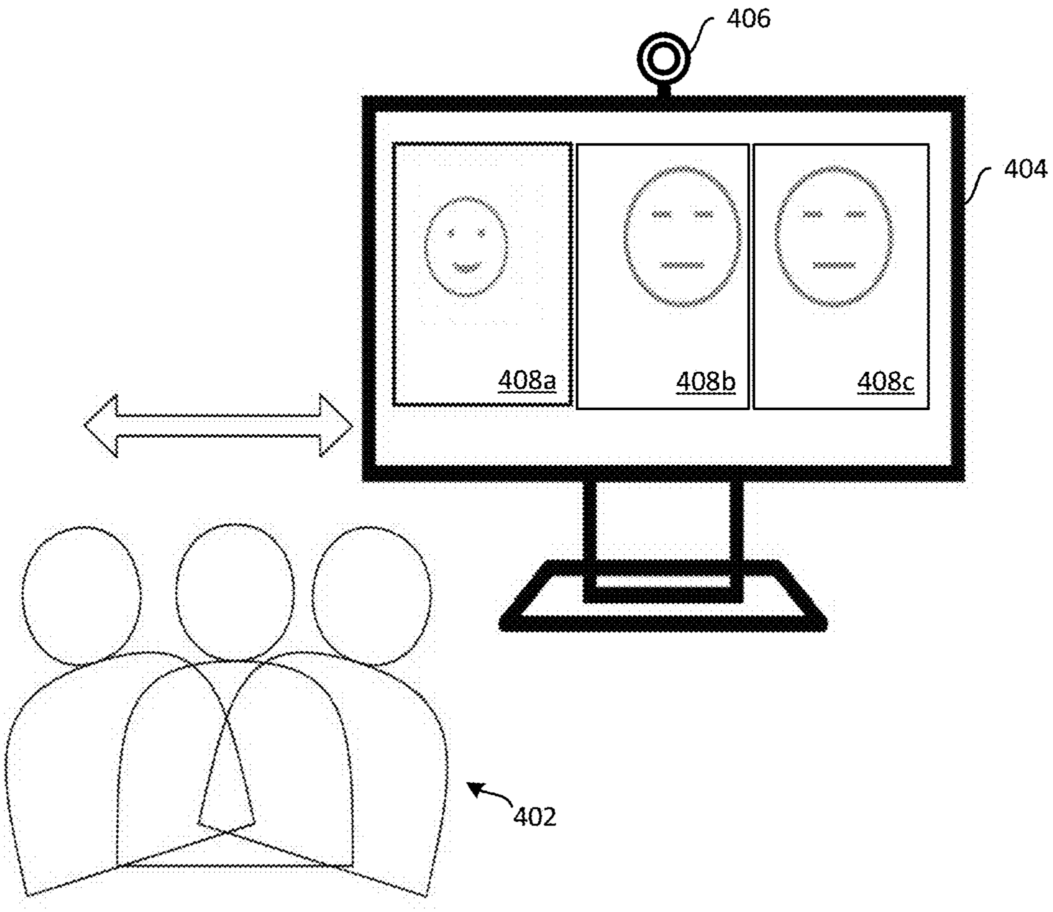

FIGS. 4A and 4B illustrate stabilization of a participant's orientation during an online meeting, in accordance with an embodiment of the present disclosure. As shown in FIG. 4A, a user 402 may use an online meeting application (sometimes referred to herein more simply as a "meeting application") installed on a client device 404 to join and participate in (e.g., attend) an online meeting (sometimes referred to herein more simply as a "meeting") with one or more other users (e.g., users of remote client devices). Client device 404 can include or otherwise have access to a camera 406 (e.g., a video camera or webcam) which can be used to capture a video stream (e.g., showing user 402). In response to the user joining the online meeting, the meeting application may display views 408*a*, 408*b*, 408*c* (408 generally) on a monitor or other display device of client device 404. For example, view 408*a* may display a video stream associated with user 402 and views 408*b*, 408*c* may display video streams associated with two other users participating in the meeting. The meeting application running on client device 402*a* may provide (e.g., generate) the video stream displayed within view 408*a*. The video stream associated with user 402 may be shared with (e.g., transmitted to) one or more other client devices used by the other meeting participants.

In response to user 402 joining the meeting, the meeting application on client device 404 may display a border 410 (e.g., a rectangular border) within view 408*a* as a recommended orientation (e.g., a recommended size) of the user's 402 face appearing within the video stream. User 402 may then orient camera 406 such that user 402 is within the camera's field of view. User 402 may also position him or herself within the field of view of camera 406 so that his or her face (or another body part or parts) is properly sized within border 410 (e.g., properly oriented within border 410). The meeting application may also provide a UI control to enable user 402 to adjust the size and/or positioning of border 410 within view 408*a* (e.g., to resize and/or reposition border 410 to a desired size and/or position within view 408*a*). User 402 may then use a provided UI control to generate a reference image (e.g., a digital image) which shows the desired orientation of user 402.

Turning to FIG. 4B, embodiments of the present disclosure can use a reference image of a user to detect a change in orientation of the user appearing within a video stream (or an "original video stream") of an online meeting and to modify the original video stream such that the user's orientation is stabilized when the modified video stream is displayed. In some embodiments, the modified video stream may correspond to another video stream that is generated by, for example, copying and then modifying an original video stream. That is, a "modified video stream" according to the present disclosure may correspond to either a modification of an original video stream or to another video stream that is generated based on the original video stream. In some embodiments, the modified video stream may be transmitted to client devices of other meeting participants instead of the original video stream (e.g., instead of the captured video stream). In some embodiments, the modified video stream may be displayed by the client device that performed the modification (e.g., in addition to transmitting the modified video stream to other client devices).

In the example of FIG. 4B, a modified video stream may be displayed in view 408*a* in which the orientation of user 402 is stabilized. As shown in FIG. 4B, during the meeting, user 402 may change his or her orientation (e.g., move back-and-forth, move side-to-side, and/or move in and out of the field of view of camera 406). In some embodiments, the frames in the original video stream (i.e., the video stream captured by camera 406) containing the changed orientation may be identified and replaced or otherwise modified to generate the modified video stream.

Figure 5:
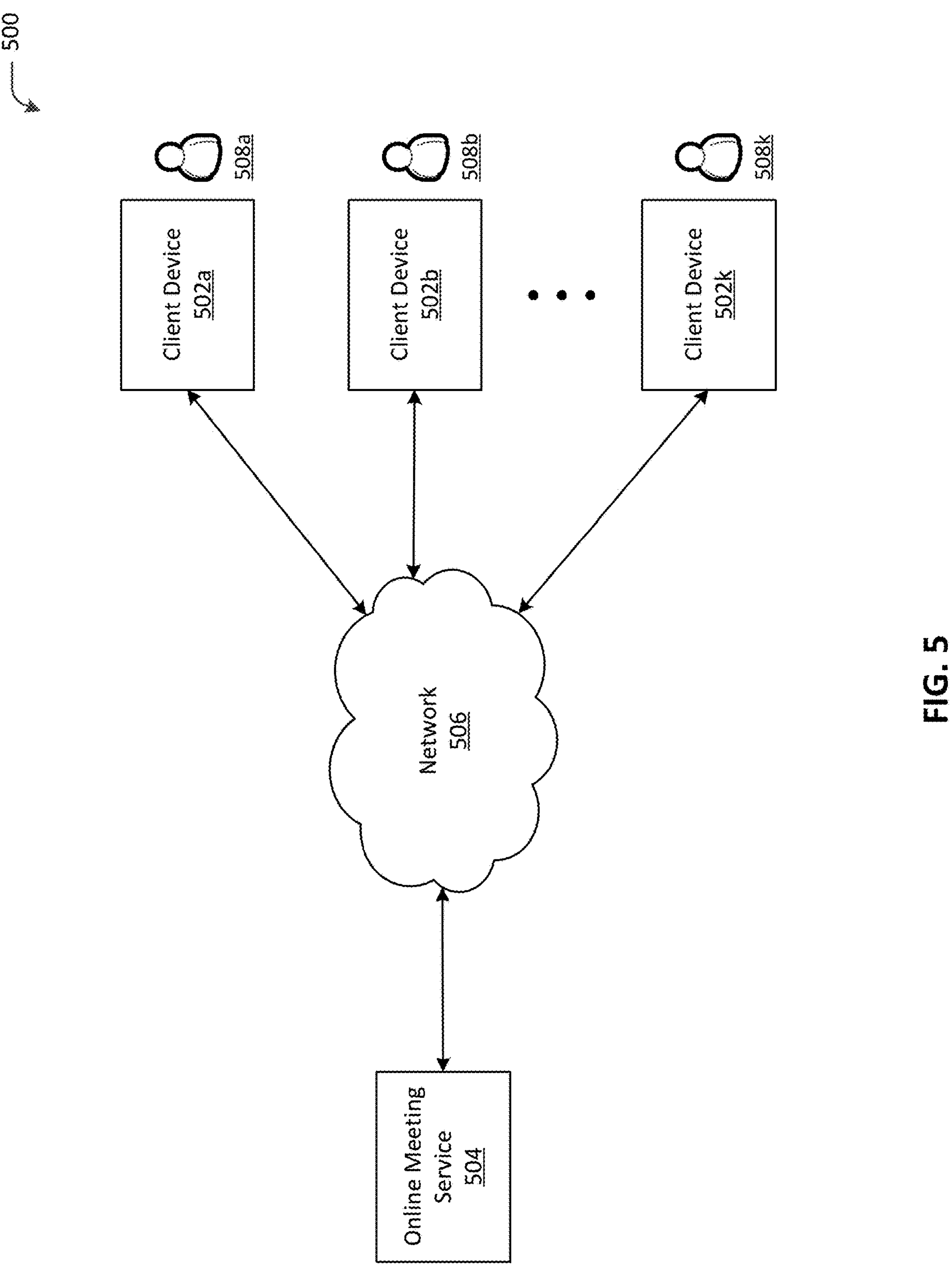
FIG. 5 is a diagram of an illustrative network environment in which participant orientation stabilization for online meetings can be provided, in accordance with an embodiment of the present disclosure.

FIG. 5 shows an illustrative network environment 500 in which participant orientation stabilization for online meetings can be provided, in accordance with an embodiment of the present disclosure. As shown, illustrative network environment 500 includes client devices 502*a*, 502*b*, . . . , 502*k* (502 generally) and an online meeting service (or "meeting service") 504. Client devices 502 may be configured to communicate with meeting service 504 via one or more computer networks 506 (e.g., via the Internet). Meeting service 504 may be provided as part of a cloud computing environment (e.g., cloud computing environment 300 of FIG. 3).

Client devices 502*a*, 502*b*, . . . , 502*k* may be used by or otherwise associated with users 508*a*, 508*b*, . . . , 508*k* (508 generally), respectively. Users 508 may correspond to participants (or "attendees") of an online meeting hosted by meeting service 504. Client devices 502 can include, for example, desktop computing devices, laptop computing devices, tablet computing devices, and/or mobile computing devices. Client devices 502 can be configured to run one or more applications, such as desktop applications, mobile applications, and SaaS applications. Among various other types of applications, client devices 502 can run a meeting application that provides audio and video conferencing among other features. For example, client devices 502 can run TEAMS, SKYPE, ZOOM, GOTOMEETING, WEBEX, or another meeting application. The meeting application running on client devices 502 can communicate with meeting service 504 and/or with the meeting applications running on other client devices 502 (e.g., using peer-to-peer communication). An example of a client device that may be the same as or similar to any of client devices 502 is described below with respect to FIG. 6. In some embodiments, a client device 502 may be the same or substantially similar to a client machine 102A-102N described above in the context of FIG. 1 and FIG. 3 and/or computing device 100 described above in the context of FIG. 2.

In the example of FIG. 5, a first user 508*a* may use a first client device 502*a* to join and participate in an online meeting with one or more other users 508*b*, . . . , 508*k* using one or more other client devices 502*b*, . . . , 502*k*. When user 502*a* joins the meeting, the meeting application on client device 502*a* may generate (e.g., create) a reference image of user 508*a*. The reference image may show a desired or preferred orientation (e.g., an appearance) of user 508*a* to be shown during the meeting. During the meeting, the meeting application on client device 502*a* may receive a video stream captured by a camera connected to or otherwise associated with client device 502*a*. The video stream may show (i.e., include an appearance of) user 508*a* along with other objects that happen to be within the camera's field of view. The meeting application on client device 502*a* can analyze the captured video stream to determine whether there is a change in orientation of user 508*a* appearing within the video stream. For example, for a particular frame in the video stream, the meeting application can compare the frame to the reference image to determine whether there is a change in orientation of user 508*a* (e.g., change in size of the user's face or other body part). In response to determining that there is a change in the orientation of user 508*a*, the client application may modify the captured video stream or generate another video stream in which the user's 508*a* orientation is stabilized (e.g., replace the frames in the video stream that show the changed orientation with the reference image or change/edit the content shown in the frames in the video stream that show the changed orientation to substantially show the orientation (e.g., appearance) of the user shown in the reference image). The modified video stream can then be transmitted to (e.g., shared with) and displayed by the one or more other client devices 502*b*, . . . , 502*k*. For example, client device 502*a* may transmit the modified video stream to meeting service 504 via networks 506 and, in turn, meeting service 504 may transmit the modified video stream (or a processed version thereof) to the other client devices 502*b*, . . . , 502*k*. As another example, client device 502*a* may transmit the modified video stream directly to the other client devices 502*b*, . . . , 502*k*.

In some embodiments, client device 502*a* may transmit the reference image of user 508*a* to meeting service 504 upon creation thereof (e.g., upon user 508*a* joining the meeting). During the meeting, client device 502*a* may transmit the captured video stream (i.e., the original or unmodified video stream) to meeting service 504 which, upon receipt thereof, can analyze the captured video stream to determine whether there is a change in orientation of user 508*a* appearing within the video stream. In response to determining that there is a change in the orientation of user 508*a*, meeting service 504 can modify the captured video stream or generate another video stream in which the user's 508*a* orientation is stabilized. That is, the stabilization of the orientation of a user appearing within a video stream disclosed herein may be performed within the online meeting service (e.g., the server computing device(s) hosting meeting service 504). This may be done, for example, to offload the processing to a more powerful computing device.

Figure 6:
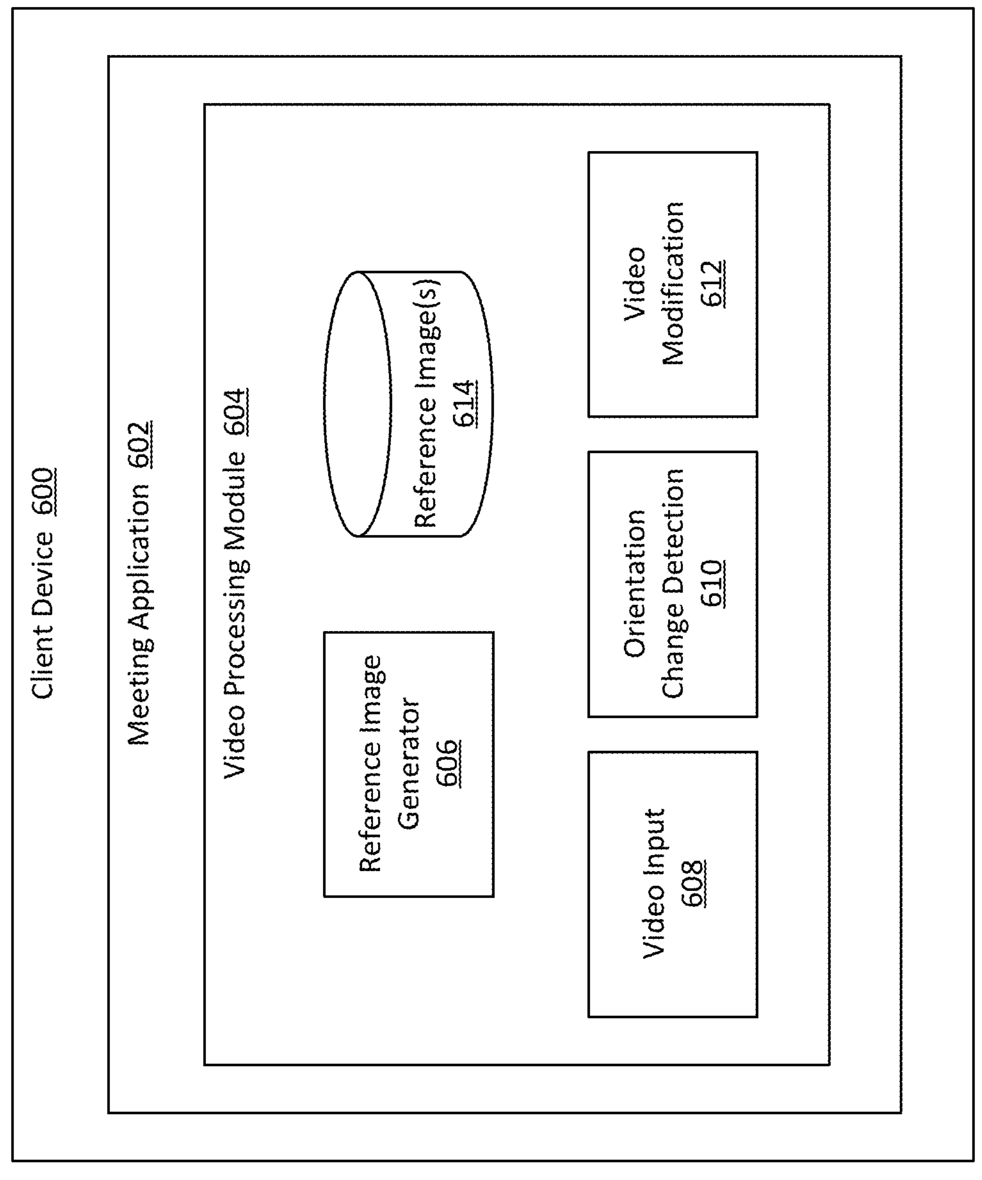
FIG. 6 is a diagram of an illustrative client device that can provide participant orientation stabilization for online meetings, in accordance with an embodiment of the present disclosure.

FIG. 6 shows an illustrative client device 600 that can be used within network environment 500 of FIG. 5, in accordance with an embodiment of the present disclosure. For example, client device 600 can correspond to client device 404 of FIG. 4 and/or any or all of client devices 502 of FIG. 5. Illustrative client device 600 can include an online meeting application (or "meeting application") 602 among various other applications. Meeting application 602 may correspond to TEAMS, SKYPE, ZOOM, GOTOMEETING, WEBEX, or another application that can provide video conferencing. Meeting application 602 may connect to an online meeting service (e.g., meeting service 504 of FIG. 5) via one or more computer networks (e.g., network 506 of FIG. 5) to join online meetings hosted thereby.

Client device 600 may be associated with a user. For example, a user may authenticate themselves with client device 600 by providing authentication credentials, such as a user identifier (or "user id") and a password. The user may then use meeting application 602 to join and participate in a meeting hosted by an online meeting service (e.g., meeting service 504 of FIG. 5). A user that is actively using client device 600 may be referred to as the "current user" of the client device.

As shown in FIG. 6, meeting application 602 on client device 600 can include a video processing module 604. Video processing module 604 may be configured to provide stabilization of the orientation of a user (e.g., a user associated with client device 600) appearing within a video stream of an online meeting. Video processing module 604 can include various submodules such as a reference image generator module 606, video input module 608, an orientation change detection module 610, and a video modification module 612.

Reference image generator module 606 can generate a reference image of the current user. For example, reference image generator module 606 can generate a reference image 614 of the current user when the current user joins the meeting. In some embodiments, reference image generator module 606 may display a border (e.g., border 410 of FIG. 4) within a view displayed on client device 600 as a guide to assist the current user in creating a reference image. The current user may then adjust the displayed border and/or his or her positioning until a desired or preferred orientation of the current user is shown within the border and/or within the view. Reference image generator module 606 can then generate reference image 614 of the current user in response to an input (e.g., in response to the current user clicking/tapping a UI control provided by meeting application 602). In some embodiments, orientation change detection module 610 may store reference image 614 in memory (e.g., in RAM) where it can be subsequently accessed and used to determine whether there is a change in orientation of the current user appearing within a video stream.

Video input module 608 can receive, as input, a video stream captured by a camera connected to or otherwise associated with client device 600 (e.g., camera 406 of FIG. 4A). The video stream may include appearances of objects within the field of view of the camera, such as the current user and other objects including, possibly, other persons. In some embodiments, video input module 608 may store the received video stream in memory (e.g., in RAM) where it can be subsequently accessed by modules 610 and/or 612. In some embodiments, video input module 608 can receive a video stream captured by another client device (e.g., a remote client device) and transmitted to client device 600 via one or more networks (e.g., network 506 of FIG. 5).

Orientation change detection module 610 can analyze the captured video stream to determine whether there is a change in the orientation of the current user appearing within the captured video stream. For example, orientation change detection module 610 may retrieve a reference image of the current user (e.g., reference image 614) from memory.

Orientation change detection module 610 may then analyze (e.g., compare) the individual images ("frames") of the captured video stream against the reference image of the current user to determine whether the orientation of the current user appearing within the captured video stream has changed. To this end, in some embodiments, for a particular frame in the captured video stream, orientation change detection module 610 may use a machine learning (ML)-based feature extraction technique to extract image features from the frame. For example, orientation change detection module 610 may use a convolutional neural network (CNN) trained to extract image features, such as edges, corners, shapes, textures, colors, etc., from images. Orientation change detection module 610 may use the same or similar ML-based feature extraction technique to extract image features from the reference image of the current user. Using the reference image of the current user as a template image, orientation change detection module 610 may use a template matching technique to match the features extracted from the frame and the reference image using a suitable distance measure (e.g., a distance calculation). For example, orientation change detection module 610 may perform the matching of the frame of the captured video stream to the reference image of the current user using a feature detection and matching algorithm such as that provided by Open Source Computer Vision (OpenCV) or another open-source project. Based on the matching (e.g., at least a 80% threshold match or another predetermined threshold match), orientation change detection module 610 can determine whether the orientation of the current user appearing within the frame has changed (e.g., whether there is a change in the orientation of the current user appearing within the video stream). The value of the threshold (e.g., the percentage of the predetermined threshold) may be configurable by the user. In some embodiments, orientation change detection module 610 may store the information regarding the features extracted from the reference image of the current user in memory (e.g., in RAM) where it can be subsequently accessed and used to match features extracted from other frames of the captured video stream.

Video modification module 612 can, in response to a determination by orientation change detection module 610 that the orientation of the current user appearing within the frame has changed, modify the captured video stream to stabilize the orientation of the current user in the captured video stream. For example, in one embodiment, video modification module 612 may replace the frame in the captured video stream that shows the changed orientation of the current user with the reference image of the current user. In other embodiments, video modification module 612 may change/edit the contents of the frame in the captured video stream that shows the changed orientation of the current user to substantially show the orientation (e.g., appearance) of the current user shown in the reference image. The modified video stream showing the stabilized orientation of the current user can then be shared with the client devices associated with the other meeting participants. For example, video processing module 604 may send the modified video stream to the client devices associated with the other meeting participants.

Figure 7:
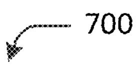
FIG. 7 is a flow diagram of an illustrative process for stabilizing a participant's orientation during an online meeting, in accordance with an embodiment of the present disclosure.
Figure 7:
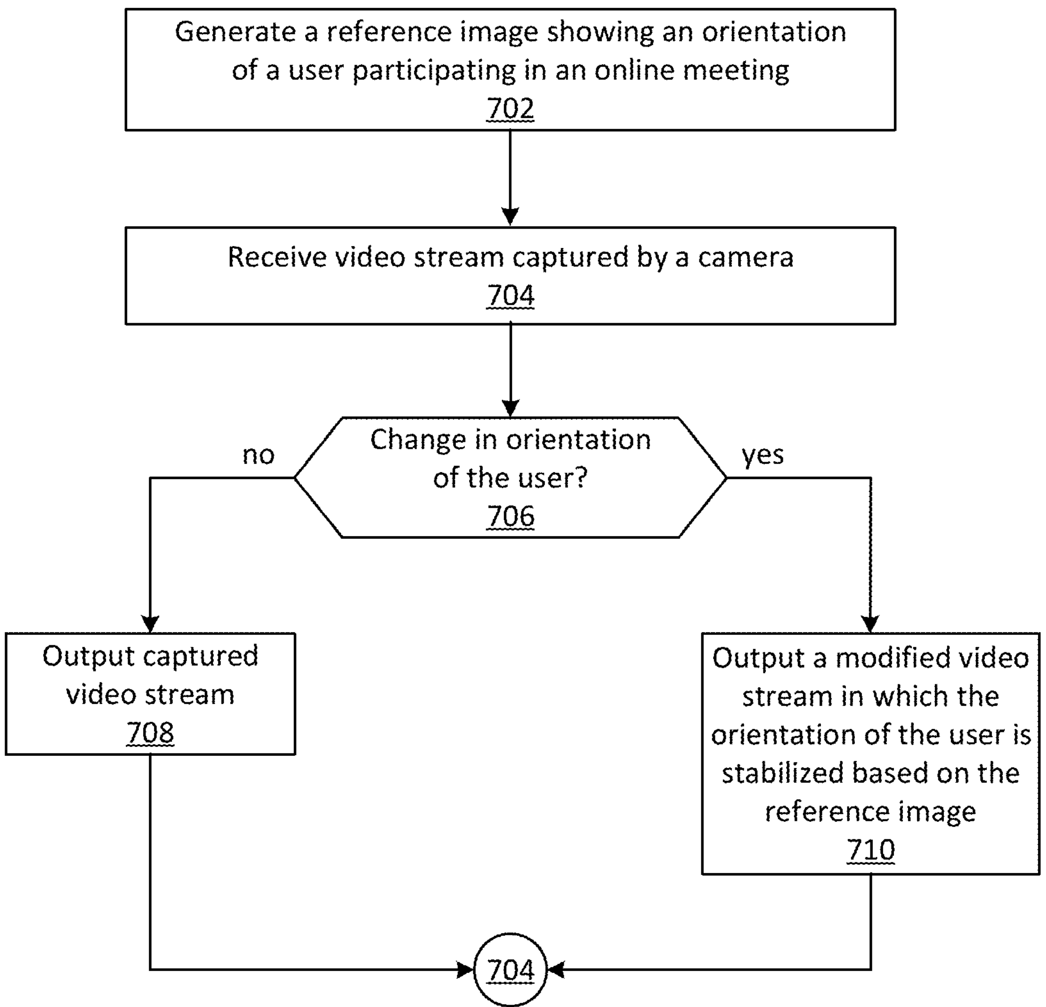

FIG. 7 is a flow diagram of an illustrative process 700 for stabilizing a participant's orientation during an online meeting, in accordance with an embodiment of the present disclosure. Process 700 may be implemented by a computing device being used by a user to participate in an online meeting, such as client device 600 or FIG. 6. In some embodiments, at least a portion of process 700 may be implemented within an online meeting service, such as meeting service 504 of FIG. 5.

Referring to process 700, at 702, a reference image showing an orientation of a user participating in an online meeting can be generated. For example, the user may be using a meeting application (e.g., meeting application 602 of FIG. 6) running on a computing device (e.g., computing device 602 of FIG. 6) to participate in the online meeting. When the user (e.g., the current user of the computing device) joins the online meeting, an image taking submodule included in a video processing module of the meeting application (e.g., reference image generator 606 included in video processing module 604 of FIG. 6) may generate a reference image of the user. The generated reference image may be of a desired orientation of the user using the computing device to participate in the online meeting.

At 704, a video stream captured by a camera can be received. The captured video stream may be received by a video input submodule included in the video processing module of the meeting application (e.g., video input module 608 of FIG. 6). The captured video stream may include appearances of the user using the computing device to participate in the online meeting.

At 706, a check can be made to determine whether there is a change in orientation of the user appearing in the captured video stream. An orientation change detection submodule included in the video processing module of the meeting application (e.g., orientation change detection module 610 of FIG. 6) may analyze the individual frames of the captured video stream to determine whether there is a change in the orientation of the user. For example, the orientation change detection submodule may compare the individual frames against the reference image of the user to determine whether the orientation of the user has changed.

If it is determined that the orientation of the user has not changed, at 708, the captured video stream can be output. The captured video stream may be output by the meeting application and sent to the meeting service for sharing with the other meeting participants. The meeting application can then continue processing other video streams received during the online meeting (e.g., continue processing at block 704).

Otherwise, if it is determined that the orientation of the user has changed, at 712, a modified video stream in which the orientation of the user is stabilized based on the reference image of the user can be output. A video modification submodule included in the video processing module of the meeting application (e.g., video modification module 612 of FIG. 6) may modify the captured video stream by replacing the frames in the captured video stream that shows the changed orientation of the current user with the reference image of the current user. The modified video stream may then be output by the meeting application and sent to the meeting service for sharing with the other meeting participants in place of the captured video stream (e.g., the original video stream that was captured by the camera). The meeting application can then continue processing other video streams received during the online meeting (e.g., continue processing at block 704).

FURTHER EXAMPLE EMBODIMENTS

The following examples pertain to further embodiments, from which numerous permutations and configurations will be apparent.

Example 1 includes a method including: determining, by a computing device, a reference image showing an orientation of a user participating in an online meeting; receiving, by the computing device, a video stream captured by a camera, the video stream associated with the online meeting; and responsive to a determination of a change in the orientation of the user appearing within the video stream: providing, by the computing device, a modified video stream in which the orientation of the user is adjusted based on the reference image.

Example 2 includes the subject matter of Example 1, wherein providing the modified video stream includes enlarging a size of a face of the user in the video stream.

Example 3 includes the subject matter of any of Examples 1 and 2, wherein providing the modified video stream includes reducing a size of a face of the user in the video stream.

Example 4 includes the subject matter of any of Examples 1 through 3, wherein providing the modified video stream includes repositioning a face of the user in the video stream.

Example 5 includes the subject matter of any of Examples 1 through 4, wherein determining the reference image comprises receiving the reference image from another computing device.

Example 6 includes the subject matter of any of Examples 1 through 5, wherein the determination of the change in the orientation of the user is based on a comparison of an image of the video stream to the reference image.

Example 7 includes the subject matter of any of Examples 1 through 6, wherein the video stream is received from a first client device, the method further including transmitting, by the computing device, the modified video stream to the first client device.

Example 8 includes the subject matter of any of Examples 1 through 7, wherein the video stream is received from a first client device, the method further including transmitting, by the computing device, the modified video stream to a second client device.

Example 9 includes the subject matter of any of Examples 1 through 8, wherein the modified video stream is included in another video stream of the online meeting.

Example 10 includes a system including a processor and a non-volatile memory storing computer program code that when executed on the processor causes the processor to execute a process operable to: determine a reference image showing an orientation of a user participating in an online meeting; receive a video stream captured by a camera, the video stream associated with the online meeting; and, responsive to a determination of a change in the orientation of the user appearing within the video stream, provide a modified video stream in which the orientation of the user is adjusted based on the reference image.

Example 11 includes the subject matter of Example 10, wherein to provide the modified video stream includes to enlarge a size of a face of the user in the video stream.

Example 12 includes the subject matter of any of Examples 10 and 11, wherein to provide the modified video stream includes to reduce a size of a face of the user in the video stream.

Example 13 includes the subject matter of any of Examples 10 through 12, wherein to provide the modified video stream includes to reposition a face of the user in the video stream.

Example 14 includes the subject matter of any of Examples 10 through 13, wherein to determine the reference image includes to receive the reference image from another computing device.

Example 15 includes the subject matter of any of Examples 10 through 14, wherein the determination of the change in the orientation of the user is based on a comparison of an image of the video stream to the reference image.

Example 16 includes the subject matter of any of Examples 10 through 15, wherein the video stream is received from a first client device, and the process is further operable to transmit the modified video stream to the first client device.

Example 17 includes the subject matter of any of Examples 10 through 16, wherein the video stream is received from a first client device, and the process is further operable to transmit the modified video stream to a second client device.

Example 18 includes the subject matter of any of Examples 10 through 17, wherein the modified video stream is included in another video stream of the online meeting.

Example 19 includes a non-transitory machine-readable medium encoding instructions that when executed by one or more processors cause a process to be carried out. The process includes: determining a reference image showing an orientation of a user participating in an online meeting; receiving a video stream captured by a camera, the video stream associated with the online meeting; and, responsive to a determination of a change in the orientation of the user appearing within the video stream, providing a modified video stream in which the orientation of the user is adjusted based on the reference image.

Example 20 includes the subject matter of Example 19, wherein providing the modified video stream includes enlarging a size of a face of the user in the video stream.

Example 21 includes the subject matter of any of Examples 19 and 20, wherein providing the modified video stream includes reducing a size of a face of the user in the video stream.

Example 22 includes the subject matter of any of Examples 19 through 21, wherein providing the modified video stream includes repositioning a face of the user in the video stream.

Example 23 includes the subject matter of any of Examples 19 through 22, wherein determining the reference image comprises receiving the reference image from another computing device.

Example 24 includes the subject matter of any of Examples 19 through 23, wherein the determination of the change in the orientation of the user is based on a comparison of an image of the video stream to the reference image.

Example 25 includes the subject matter of any of Examples 19 through 24, wherein the video stream is received from a first client device, the method further including transmitting, by the computing device, the modified video stream to the first client device.

Example 26 includes the subject matter of any of Examples 19 through 25, wherein the video stream is received from a first client device, the method further including transmitting, by the computing device, the modified video stream to a second client device.

Example 27 includes the subject matter of any of Examples 19 through 26, wherein the modified video stream is included in another video stream of the online meeting.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect, connecting, and coupling.

All examples and conditional language recited in the present disclosure are intended for pedagogical examples to aid the reader in understanding the present disclosure, and are to be construed as being without limitation to such specifically recited examples and conditions. Although example embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A method comprising:

determining, by a computing device, a reference image showing a first orientation of a user participating in an online meeting, wherein the reference image is generated in response to the user joining the online meeting and being positioned within a field of view of a camera;

receiving, by the computing device, a video stream captured by the camera, the video stream associated with the online meeting, the video stream showing the user in a second orientation different from the first orientation; and responsive to a determination of a change in the second orientation of the user appearing in the video stream relative to the first orientation and positioned within the field of view of the camera:

generating, by the computing device, a modified video stream from the video stream captured by the camera, the modified video stream generated to change the second orientation of the user to substantially match the first orientation from the reference image; and providing, by the computing device, the modified video stream in which the second orientation of the user is adjusted to substantially match the first orientation based on the reference image.

2. The method of claim 1, wherein providing the modified video stream includes enlarging a size of a face of the user in the video stream.

3. The method of claim 1, wherein providing the modified video stream includes reducing a size of a face of the user in the video stream.

4. The method of claim 1, wherein providing the modified video stream includes repositioning a face of the user in the video stream.

5. The method of claim 1, wherein determining the reference image comprises receiving the reference image from another computing device.

6. The method of claim 1, wherein the determination of the change in the second orientation of the user relative to the first orientation is based on a comparison of an image of the video stream to the reference image.

7. The method of claim 1, wherein the video stream is received from a first client device, the method further comprising:

transmitting, by the computing device, the modified video stream to the first client device.

8. The method of claim 1, wherein the video stream is received from a first client device, the method further comprising:

transmitting, by the computing device, the modified video stream to a second client device.

9. The method of claim 1, wherein the modified video stream is included in another video stream of the online meeting.

10. A system comprising:

a processor; and a non-volatile memory storing computer program code that when executed on the processor causes the processor to execute a process operable to:

determine a reference image showing a first orientation of a user participating in an online meeting, wherein the reference image is generated in response to the user joining the online meeting and being positioned within a field of view of a camera;

receive a video stream captured by the camera, the video stream associated with the online meeting, the video stream showing the user in a second orientation different from the first orientation; and responsive to a determination of a change in the second orientation of the user appearing within in the video stream relative to the first orientation and positioned within the field of view of the camera:

generate a modified video stream from the video stream captured by the camera, the modified video stream generated to change the second orientation of the user to substantially match the first orientation from the reference image; and provide the modified video stream in which the second orientation of the user is adjusted to substantially match the first orientation based on the reference image.

11. The system of claim 10, wherein to provide the modified video stream includes to enlarge a size of a face of the user in the video stream.

12. The system of claim 10, wherein to provide the modified video stream includes to reduce a size of a face of the user in the video stream.

13. The system of claim 10, wherein to provide the modified video stream includes to reposition a face of the user in the video stream.

14. The system of claim 10, wherein to determine the reference image includes to receive the reference image from another computing device.

15. The system of claim 10, wherein the determination of the change in the second orientation of the user relative to the first orientation is based on a comparison of an image of the video stream to the reference image.

16. The system of claim 10, wherein the video stream is received from a first client device, and wherein the process is further operable to:

transmit the modified video stream to the first client device.

17. The system of claim 10, wherein the video stream is received from a first client device, and wherein the process is further operable to:

transmit the modified video stream to a second client device.

18. The system of claim 10, wherein the modified video stream is included in another video stream of the online meeting.

19. A non-transitory machine-readable medium encoding instructions that when executed by one or more processors cause a process to be carried out, the process comprising:

determining a reference image showing a first orientation of a user participating in an online meeting, wherein the reference image is generated in response to the user joining the online meeting and being positioned within a field of view of a camera;

receiving a video stream captured by the camera, the video stream associated with the online meeting, the video stream showing the user in a second orientation different from the first orientation; and responsive to a determination of a change in the second orientation of the user appearing in the video stream relative to the first orientation and positioned within the field of view of the camera video stream:

generating a modified video stream from the video stream captured by the camera, the modified video stream generated to change the second orientation of the user to substantially match the first orientation from the reference image; and providing a modified video stream in which the second orientation of the user is adjusted to substantially match the first orientation based on the reference image.

20. The machine-readable medium of claim 19, wherein providing the modified video stream includes one of enlarging a size of a face of the user in the video stream, reducing the size of the face of the user in the video stream, or repositioning the face of the user in the video stream.

* * * * *